Feb. 28, 1933.  H. G. KAMRATH  1,899,910
CRANK CASE VENTILATION
Filed Aug. 3, 1927
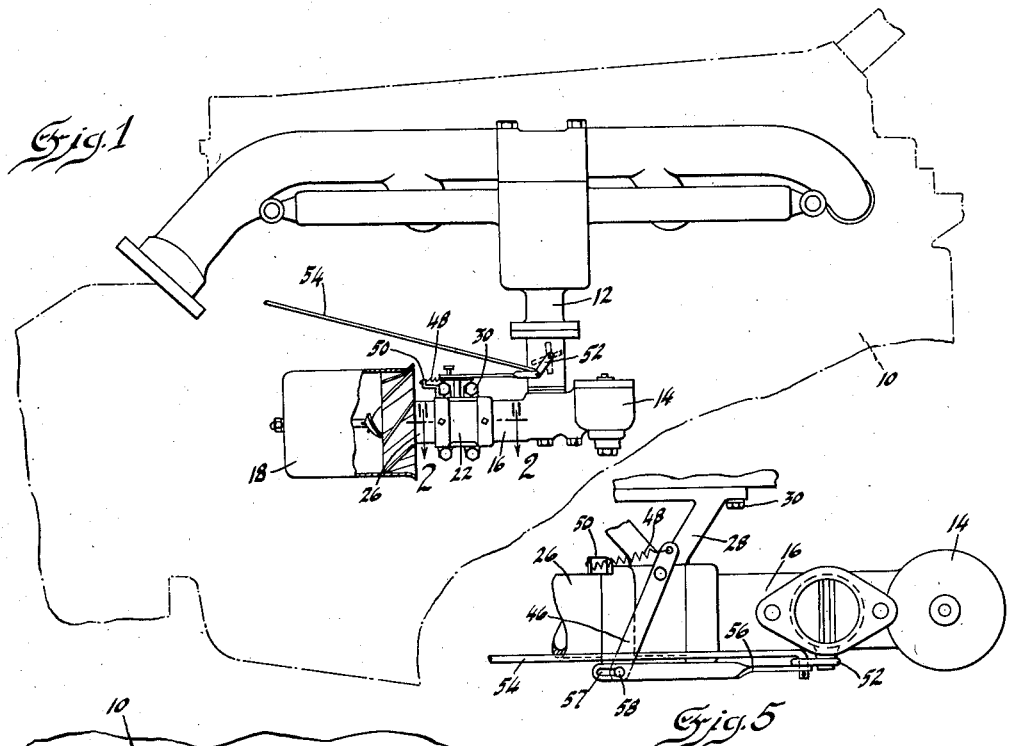
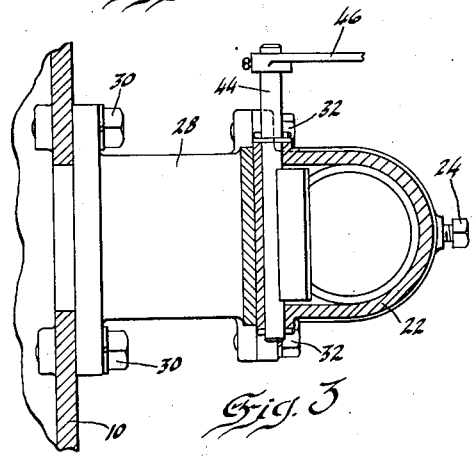
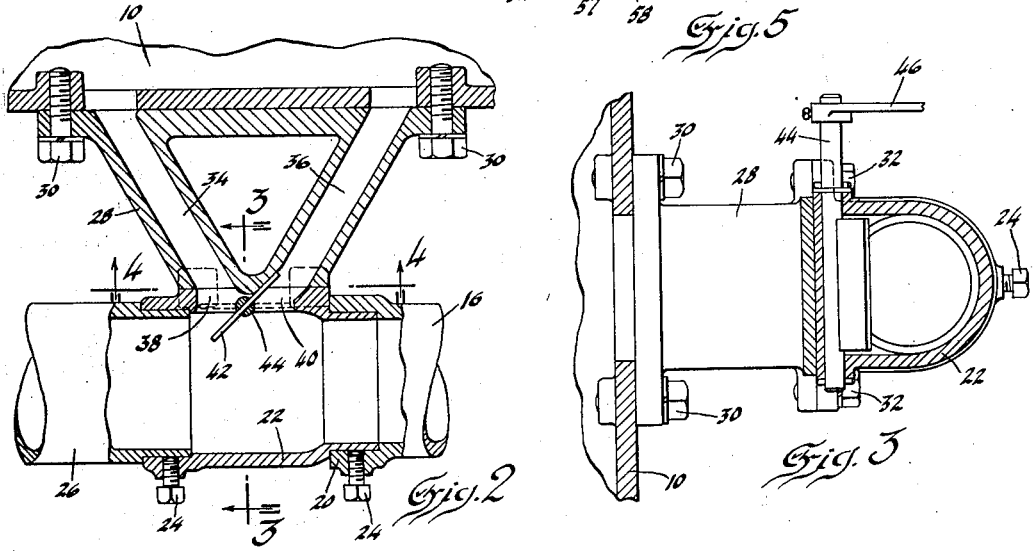
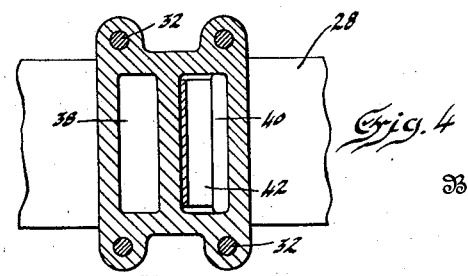
Inventor
Herbert G. Kamrath
By Blackmore, Spencer & Hulit
Attorneys Patented Feb. 28, 1933

1,899,910

UNITED STATES PATENT OFFICE

HERBERT G. KAMRATH, OF FLINT, MICHIGAN, ASSIGNOR TO A C SPARK PLUG COMPANY, OF FLINT, MICHIGAN, A CORPORATION OF MICHIGAN

CRANK CASE VENTILATION

Application filed August 3, 1927. Serial No. 210,426.

This invention relates to crankcase ventilators for automobile engines and more particularly to ventilators of this character in which air from the crankcase is conducted to the carburetor intake.

In ventilating devices of this character, it is necessary to pass a considerable quantity of air through the crankcase at low engine speeds in order to secure adequate ventilation. In case a fixed ratio is maintained between the current that passes through the crankcase and that part which passes directly to the engine, high engine speeds will produce such a strong current of air through the crankcase that fine particles of oil will be carried into the carburetor and thence into the engine.

It is an object of this invention to provide a ventilating device of this character which will divert from the air intake through the engine crankcase and back into the intake a current of air sufficient to insure adequate ventilation of the crankcase at low engine speeds and which will compensate for the greatly increased velocity through the intake manifold, incident to higher engine speeds, by reducing the proportion of the incoming air which is diverted through the crankcase.

More specifically it is an object of this invention to provide a by-pass conduit leading from the air intake to the crankcase and back to the intake with a damper which may be opened for diverting part of the incoming air through the crankcase, the damper being connected with the throttle so that it will be closed as the throttle is opened and opened as the throttle is closed.

While the amount of air passing through the crankcase is regulated by the position of the throttle, this coincides roughly with the needs of the engine as high speed operation for any considerable length of time warms the crankcase and considerably less ventilation is required.

Further objects and advantages of the invention will appear in the course of the following description, taken in connection with the accompanying drawing.

In the drawing:

Figure 1 is a side elevation showing my device mounted on an engine and controlled from the throttle, part of the air cleaner being shown broken away.

Figure 2 is an enlarged plan view, partly in section, taken in the direction indicated by the arrows 2—2 in Figure 1.

Figure 3 is a cross sectional view of the structure taken on the line 3—3 in Figure 2.

Figure 4 is a section taken along the line 4—4 in Figure 2.

Figure 5 is a plan view with parts broken away, showing the means for operating the by-pass valve with the throttle.

Referring to the drawing, the numeral 10 indicates generally a conventional internal combustion engine provided with the riser pipe 12 leading to the intake manifold, the carburetor 14, air intake pipe 16 and air cleaner 18. My improved device is connected to the air intake pipe between the carburetor and air cleaner.

The intake pipe 16 is enlarged as shown at 20 and fitting in this enlarged part is the connecting section 22. This section carries at its other end the pipe 26 which extends into and is rigid with the air cleaner 18. The pipes 16 and 26 are fixed to the section 22 by means of set screws 24. Connecting the section 22 with the crankcase 10 is the casting 28, fixed to the crankcase by the bolts 30 and to the section 22 by means of the bolts 32. The casting 28 is Y-shaped to provide two conduits 34 and 36 fitting over corresponding apertures in the crankcase. The section 22 is provided with apertures 38 and 40 registering with the conduits 34 and 36 and fitting snugly thereover. The pipes 16 and 26 and section 22 are hereinafter referred to as the air intake.

Pivoted to the section 22 between the openings 38 and 40 is the damper 42, the supporting rod 44 of which extends up through the section 22 and is provided with a laterally extending arm 46. This arm 46 is connected by means of a coil spring 48 to a fixed arm or abutment 50 mounted adjacent thereto. The spring normally holds the damper 42 in open position as illustrated in Figure 2. The numeral 52 indicates the ordinary throttle valve lever operated by means of the rod 54 leading to the throttle. A link 56 is pivoted to the lower end of the lever 52 and is connected with the arm 46 by means of a pin 58 fixed to the arm 46 and extending through a longitudinal slot 57 in the link 56.

The operation of my device will now be described. With the throttle in its normal closed position and the engine running slowly, the valve 42 is held in its open position as shown in Figure 2. As the throttle is opened, the link 56 moves forward, or to the right as viewed in Figure 1. The slot in the link 56 permits the throttle to be opened to some extent before movement of the link 56 is transmitted to the arm 46 to rotate the supporting rod 44 of the damper but as the throttle is moved toward full open position the link 56 rotates the rod 44 and when the throttle is wide open the damper is fully closed, as indicated in dotted lines 43 in Figure 2.

When the damper 42 is open, a maximum proportion of the air entering the cleaner and air intake is deflected by the damper 42 through the conduit 34 and into the crankcase and this same current of air, of course, passes out of the crankcase through the conduit 36 back into the air intake. As the throttle opens the damper closes, and a gradually decreasing proportion of the air that enters the air intake is deflected into the crankcase until, when the throttle is wide open, the damper 42 is closed.

I claim:

1. In combination with an internal combustion engine including an air intake and a throttle, openings leading from the intake into the engine crankcase, an element in said intake for deflecting a part of the incoming air into one of the openings and movable to vary the effective size of said opening, and means operated by opening and closing of the throttle for moving said element.

2. In combination with an internal combustion engine including an air intake and a throttle, openings leading from the intake into the engine crankcase, an element in said intake movable to vary the effective size of said openings, and means operated by opening and closing of the throttle for moving said element.

3. In combination with an internal combustion engine including an air intake, openings leading from the intake into the engine crankcase, an element in said intake for deflecting incoming air into one of said openings and movable to vary the effective size of said openings in ratio to the flow of air passing through said intake.

4. In combination with an internal combustion engine including an air intake and a throttle, an opening in said intake leading to the engine crankcase, an element in said intake resiliently held in open position and movable to retard the passage of air through said opening, and a lost motion connection between the throttle and said element whereby opening of the throttle past a certain point progressively moves said element to retard the passage of air through said opening.

5. In combination with an internal combustion engine including a carburetor, an air intake connected with said carburetor having openings from the engine crankcase and from the outside, and means operable by an increase in the speed of the engine for decreasing the effective size of the opening from the crankcase and simultaneously increasing the effective size of the opening from the outside.

6. In combination with an internal combustion engine including a carburetor, an air intake connected with said carburetor having openings from the engine crankcase and from the outside, and means operable by an increase in the speed of the engine for progressively restricting the effective size of the opening from the crankcase and simultaneously increasing the effective size of the opening from the outside.

7. In combination with an internal combustion engine including a carburetor, an air intake connected with said carburetor, an opening into said intake from the crankcase and from the outside, a valve member pivoted adjacent said openings and adapted to swing from a position partially obstructing the outside opening toward a position closing the opening from the crankcase, and means for resiliently holding said valve member in said first named position.

8. In combination with an internal combustion engine including a carburetor, an air intake connected with said carburetor, an outside opening in the intake, adjacent openings between the outside opening and the carburetor and leading to different parts of the crankcase, a valve member adapted to move from a position obstructing the passage of air from the outside opening to the carburetor and deflecting the obstructed current into the first crankcase opening, toward a position obstructing the second opening into the crankcase, and means for resiliently holding said valve member in said first named position.

9. In combination with an internal combustion engine including a carburetor, an air intake connected with said carburetor and having a passageway leading directly to the outside, two openings at an angle to this passageway and leading to different parts of the crankcase, a valve member pivoted between the two openings and adapted to swing from a position obstructing part of the current of air and deflecting it into said first opening, toward a position obstructing said second opening, and means for resiliently holding said valve member in said first named position.

10. The combination of an internal combustion engine having a crankcase and a throttle valve, said crankcase being provided with an inlet passage and an outlet passage, means for causing a stream of air to be drawn into said crankcase through the inlet passage and discharged through said outlet passage, a valve in one of said passages, and means connecting said valves for causing the second named valve to close as the throttle valve is opened, said last named means being provided with a lost motion connection so as to permit the throttle valve to open independently of the second named valve during the initial part of its movement.

11. The combination of an internal combustion engine having a crankcase and a throttle valve, said crankcase being provided with an inlet passage and an outlet passage, means for causing a stream of air to be drawn into said crankcase through the inlet passage and discharged through said outlet passage, a valve in one of said passages, and means connecting said valves for causing the second named valve to close as the throttle valve is opened, said second named valve being provided with a portion controlling the other of said passages.

12. The combination of an internal combustion engine having an air intake and a crankcase, conduits leading from the crankcase and joining the air intake alongside each other, and a valve located at the point of junction of said conduits and said air intake and movable to control flow through said conduits.

In testimony whereof I affix my signature.

HERBERT G. KAMRATH.